United States Patent [19]

Antonelli et al.

[11] 4,242,243

[45] Dec. 30, 1980

[54] HIGH SOLIDS AMBIENT TEMPERATURE CURING COATINGS OF ACRYLIC-FATTY ACID DRYING OIL RESINS

[75] Inventors: Joseph A. Antonelli, Riverton, N.J.; Renee J. Kelly, Media; Joseph E. McLaughlin, Philadelphia, both of Pa.

[73] Assignee: E. I. Du Pont De Nemours and Company, Wilmington, Del.

[21] Appl. No.: 58,662

[22] Filed: Jul. 18, 1979

[51] Int. Cl.³ ..................... C08L 25/14; C08L 33/12
[52] U.S. Cl. .......................... 260/23 AR; 260/23 EP; 428/334; 525/208; 525/222; 525/242; 525/329
[58] Field of Search ..................... 260/23 EP, 23 AR; 525/208, 222, 242, 329; 428/334

[56] References Cited

U.S. PATENT DOCUMENTS

| | | | |
|---|---|---|---|
| 3,207,611 | 9/1965 | Ehren | 106/14 |
| 3,216,956 | 11/1965 | Craig | 260/23 R |
| 3,241,983 | 3/1966 | Bretz | 106/14 |
| 3,257,664 | 6/1966 | Leubner et al. | 96/115 |
| 3,284,385 | 11/1966 | D'Alelio | 260/23 R |
| 3,410,815 | 11/1968 | Phillips et al. | 260/23.5 |
| 3,480,574 | 11/1969 | Hahn et al. | 260/21 |
| 3,483,152 | 12/1969 | Kohn | 260/23.7 |
| 3,551,368 | 12/1970 | Sahni | 260/23 R |
| 3,585,160 | 6/1971 | Miller et al. | 260/22 CB |
| 3,676,384 | 7/1972 | Rheineck et al. | 260/23 EP |
| 3,719,619 | 3/1973 | Nagata et al. | 260/22 CB |
| 3,748,293 | 7/1973 | Torelli | 260/21 |
| 3,772,227 | 11/1973 | Kapalko et al. | 260/18 R |
| 3,816,557 | 6/1974 | Swanson et al. | 260/23 EP |
| 3,819,567 | 6/1974 | Swanson et al. | 260/23 EP |
| 3,835,076 | 9/1974 | Jeffery et al. | 260/23 EP |
| 3,919,146 | 11/1975 | Emmons | 260/23 EP |
| 3,996,309 | 12/1976 | Dowbenko et al. | 260/23 EP |
| 4,090,886 | 5/1978 | Turner | 260/22 CA |
| 4,129,537 | 12/1978 | Dhein et al. | 260/23 EP |
| 4,136,070 | 1/1979 | Hazan | 260/23 AR |
| 4,146,519 | 3/1979 | Dhein et al. | 260/23 AR |

OTHER PUBLICATIONS

"ALUSEC" 510 and 515-6 page brochure by Manchem Limited (copy in 260/22 R).
Ind. Eng., Prod. Res. Develop., vol. 12, No. 3, 1973, pp. 166–171, (copy in 260/22 R).

*Primary Examiner*—Ronald W. Griffin

[57] ABSTRACT

A high solids coating composition that dries rapidly to a tack-free finish and cures under ambient temperature conditions to a durable finish useful for metals, plastics, wood, fiberglass reinforced plastics; the coating composition is used as a finish for automobiles, trucks, trailers, tractors, appliances and airplanes and also used to refinish automobiles and trucks; the film forming polymer of the coating composition has a backbone of polymerized monomers of an alkyl methacrylate such as methyl methacrylate or styrene, an alkyl acrylate and hydroxyl containing monomers such as a hydroxy alkyl acrylate or a hydroxy alkyl methacrylate and has attached thereto pendant drying oil fatty acid groups to provide the composition with ambient curing characteristics; wherein these drying oil fatty acid groups are attached by a reaction of the carboxyl group of the drying oil fatty acid and pendant hydroxyl group of the polymer backbone.

29 Claims, No Drawings

HIGH SOLIDS AMBIENT TEMPERATURE CURING COATINGS OF ACRYLIC-FATTY ACID DRYING OIL RESINS

BACKGROUND OF THE INVENTION

This invention is related to a high solids coating composition and in particular to a high solids coating composition that dries rapidly and cures at ambient temperatures.

Manufacturing industries are in need of coating compositions that have a high resin solids content to meet reduced solvent emmissions requirements, that dry and cure at ambient temperatures and thereby conserve energy, that dry rapidly to a tack-free finish so that a coated article can be further processed, and that form cured finishes that have good physical properties. Conventional alkyd resin coating compositions generally do not have a high solids content and do not dry rapidly at ambient temperatures.

Coating compositions of acrylic-alkyd resins such as those shown in Miller et al. U.S. Pat. No. 3,585,160 issued June 15, 1971 in which drying oil fatty acid esters are attached to an acrylic segment by a vinyl oxazoline ester generally do not have a high solids content since the polymers used therein have a relatively high molecular weight. Coating compositions of acrylic-alkyd polymers in which drying oil fatty acids are attached to an acrylic segment through a glycidyl functionality, such as glycidyl methacrylate, generally do not have a high solids content since the molecular weight of the polymer is usually high caused by side reactions that occur during formation of the acrylic-alkyd polymer.

The novel coating composition of this invention meets the aforementioned needs, has a high resin solids content, dries rapidly to a tackfree finish, cures at ambient temperatures and forms a finish that has good physical properties such as a high gloss, water spot resistance, resistance to humidity, excellent adhesion to metal substrates and good hardness.

SUMMARY OF THE INVENTION

The coating composition has a high polymer solids content in which the polymer has a backbone of polymerized monomers selected from the following group: an alkyl methacrylate, an alkyl acrylate, styrene or mixtures of these monomers and polymerized hydroxyl containing monomers which are selected from the following group: a hydroxyl alkyl acrylate, a hydroxy alkyl methacrylate or mixtures thereof; wherein an active hydrogen of at least one pendant hydroxyl group of the backbone is replaced by

where R is the residual of a drying oil fatty acid and wherein the polymer has a glass transition temperature at least 20° C. and above.

DETAILED DESCRIPTION OF THE INVENTION

The coating composition has a polymer solids content of about 30–95% by weight and contains about 5–70% by weight of a solvent for the polymer. The composition usually contains in addition to the above, pigments, driers and plasticizers. A portion of the solvent can be replaced with a reactive diluent which is a solvent for the polymer but reacts with the polymer on drying to form a film.

The polymer used in the coating composition has a backbone of polymerized monomers from the following group: an alkyl methacrylate, an alkyl acrylate, styrene or mixtures of these monomers and hydroxyl containing monomers such as hydroxy alkyl methacrylate, hydroxy alkyl acrylate or mixtures thereof. At least one of the pendant hydroxyl groups of the backbone is reacted with the carboxyl group of a drying oil fatty acid to provide a pending constituent that will cure under ambient temperatures.

The above monomers are chosen so that the resulting polymer has a glass transition temperature (Tg) of at least 20° C. and up to about 65° C. The polymer has a number average molecular weight (Mn) of about 1,500–8,000, a weight average molecular weight (Mw) of about 6,000–30,000 and a molecular weight distribution (Mw Dist.) Mw/Mn of about 1–5. Preferably, to form a quality high solids coating composition, the polymer a Mn of 3,000–7,000 and a Mw of 10,000–25,000 and a Mw Dist. about 2–4.

The molecular weight of the polymer is determined by gel permeation chromatography using polystyrene as a standard.

The glass transition temperature of the polymer is determined by thermomechanical analysis or by differential scanning calorimetry.

The polymer is prepared by using standard solution polymerization techniques in which monomers for the polymer backbone are charged into a conventional polymerization vessel with an appropriate solvent, polymerization catalyst and chain transfer agent and heated to about 75°–200° C. for about 0.5–5 hours to form the polymer backbone. Then drying oil fatty acids are added with an appropriate esterification catalyst and the resulting reaction mixture is heated to about 130°–250° C. for about 1–3 hours or until an acid number of the resulting polymer is less than 15, usually less than 5. Water from the reaction is removed from the vessel during the reaction.

Typically useful polymerization catalysts are azobisisobutyronitrile, 2,2-azobis(2,4-dimethylvaleronitrile), benzoyl peroxide, ditertiary butyl peroxide, tertiary butyl hydroperoxide and t-butyl peroxy pivalate and the like.

Typically useful chain transfer agents are 2-mercaptoethanol, butyl mercaptan dodecyl mercaptan, thiophenol and the like.

Typically useful solvents that can be used to prepare the polymer are methyl ethyl ketone, methyl isobutyl ketone, toluene, acetone, butyl acetate, ethylene glycol monoethyl ether acetate, xylene and other high boiling aromatic solvents.

Typical esterification catalysts are dibutyl tin oxide, barium oxide, barium hydroxide, calcium hydroxide, calcium oxide, barium naphthenate, lithium oxide, lithium hydroxide, zinc oxide, dibutyl tin dilaurate and the like.

Typical monomers used to prepare the backbone of the polymer are as follows: styrene, acrylonitrile, methacrylonitrile, alkyl methacrylates having 1–12 carbon atoms in the alkyl group such as methyl methacrylate, ethyl methacrylate, propyl methacrylate, butyl methacrylate, isobutyl methacrylate, pentyl methacrylate, hexyl methacrylate, 2-ethylhexyl methacrylate, nonyl methacrylate, lauryl methacrylate and the like, alkyl acrylates having 1-12 carbon atoms in the alkyl groups such as methyl acrylate, ethyl acrylate, propyl acrylate, butyl acrylate, pentyl acrylate, hexyl acrylate, 2-ethylhexyl acrylate, nonyl acrylate, lauryl acrylate and the like, and mixtures of the above monomers. The backbone monomers are chosen to provide the polymer resulting with a Tg of at least 20° C. and above.

Typical hydroxyl containing monomers used to prepare the polymer are hydroxy alkyl methacrylates and acrylates each having 2-4 carbon atoms in the alkyl group such as hydroxy ethyl methacrylate, hydroxy propyl methacrylate, hydroxy butyl methacrylate, hydroxy ethyl acrylate, hydroxy propyl acrylate, hydroxy butyl acrylate and mixtures of the above. Other hydroxy alkyl acrylates and methacrylates that can be used are 2-hydroxy ethyl-2-ethyl acrylate, 2-hydroxy ethyl-2-butyl acrylate, 3-hydroxy propyl-2-propyl acrylate, 3-hydroxy propyl-2-butyl acrylate, 3-hydroxy butyl-2-ethyl acrylate, 3-hydroxy butyl-2-butyl acrylate, 4-hydroxy butyl-2-butyl acrylate 2-hydroxy ethyl-2-ethyl methacrylate and mixtures of the above monomers.

Typically useful drying oil fatty acids are oleic acid, linoleic acid, linolenic acid, eleostearic acid, ricinoleic acid, dehydrated ricinoleic acid and mixtures thereof. These drying oil fatty acids can be obtained from soya oil, dehydrated castor oil, linseed oil, tung oil, safflower oil and sun flower seed oil. Synthetic mixtures of these drying oil fatty acids can be used. One preferred mixture comprises oleic acid, linoleic acid and conjugated linoleic acid.

One useful polymer that forms high quality coating compositions that form films that have good gloss adhesion and hardness comprises about 35-65% by weight of an alkyl methacrylate, preferably methyl methacrylate, 10-30% by weight of a hydroxy alkyl methacrylate or an hydroxy alkyl acrylate having 2-4 carbon atoms in the alkyl group and 25-45% by weight of drying oil fatty acids. One useful polymer of the above type comprises methyl methacrylate, hydroxy ethyl methacrylate and a mixture of oleic, linoleic and conjugated linoleic acids.

One preferred polymer comprises 40-55% by weight of methyl methacrylate, 15-25% by weight of hydroxy ethyl methacrylate and 30-40% by weight of the aforementioned mixture of drying oil fatty acids.

The polymer can contain in addition up to about 10% by weight based on the weight of the polymer, of an ester of the formula

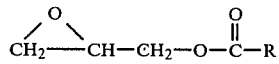

where R is an aliphatic hydrocarbon group, preferably a teritary aliphatic hydrocarbon group having 8-10 carbon atoms. Other epoxy containing monomers may be used such as ethylene oxide, butylene oxide, phenyl glycidyl ether and cyclohexene oxide. Also, multifunctional epoxy monomers can be used.

The epoxide group of the ester or the epoxy compound reacts with any residual carboxyl groups of the polymer and controls molecular weight of the polymer and prevent dimerization or trimerization of the polymer.

Blends of polymers can be used to formulate coating composition. To enhance flexibility, a polymer having a Tg of 20° C. and above can be used in combination with a polymer that has a Tg below 20° C. The Tg of the blend of polymers should be above 20° C. to provide a finish that dries to a tack free state in a relatively short period of time.

One useful blend comprises the aforementioned preferred polymer in combination with a polymer of about 35 to 55% by weight of methyl methacrylate, 15-25% by weight of a hydroxy ethyl acrylate and 30 to 40% by weight of drying oil fatty acids such as the mixture used in the above preferred polymer. Either or both of the polymers used in the blend can contain about up to 10% by weight of the aforementioned epoxy compounds.

To formulate a coating composition, the polymer after preparation which is in solution is blended with conventional driers, pigments, plasticizers and additional solvents.

Typical pigments that are used in the coating composition are metallic oxides such as titanium dioxide, iron oxide, zinc oxide, and the like, metallic flakes such as aluminum flake, bronze flake, nickel flake, metallic powders, metallic hydroxides, phthalocyanine pigments, "Monastral" pigments, molybdate pigments such as molybdate organge pigment, quinacridone pigments, sulfate pigments, carbonate pigments, carbon black pigments, silica pigments and other organic and inorganic pigments commonly used in coatings. Pigments are added in a pigment to binder weight ratio of about 0.5/100 to 200/100 where the binder is the film forming polymer constituent of the coating composition. The pigments are usually dispersed with a resin to form a pigment dispersion. The aforementioned polymer or another compatible dispersing resin can be used. The pigment dispersion is then added to the coating composition.

Organo metallic driers can be added to the coating composition in amounts of about 0.01-5% by weight, based on the weight of the coating composition. Typical metallic driers are based on cobalt, copper, lead, zirconium, calcium, iron, nickel, tin, zinc, lithium and the like and are cobalt naphthenate, copper naphthenate, lead tallate, calcium naphthenate, iron naphthenate, lithium naphthenate, lead naphthenate, nickel octoate zirconium octoate, cobalt octoate, iron octoate, zinc octoate, alkyl tin dilaurates such as dibutyl tin dilaurate and the like.

The coating composition can contain about 0.1-5% by weight, based on the weight of the polymer, of aluminum metal from an organo aluminum complex. The organo aluminum complex is added to improve curing time, improve resistance to weathering and to moisture and reduce yellowing and improve color retention of the finish. Typically useful organo aluminum complexes are disclosed in Turner U.S. Pat. No. 4,090,886 issued May 23, 1978. Typical complexes are aluminum monoisopropoxide monoversatate (monoiospropyl)phthalate, aluminum diethoxyethoxide monoversatate, aluminumtrisecondary butoxide, aluminum diisopropoxide monoacetacetic ester chelate and aluminum isopropoxide.

Conventional plasticizers can be used in the coating composition in amounts up to 30% by weight, based on the weight of the polymer, usually about 15-25% by weight of plasticizer such as alkyd resins and polyester resins is used. A linseed oil glycerol phthalate ester resin containing about 64% linseed oil is one preferred plasticizer.

About 1-40% by weight, based on the weight of the polymer, of a reactive diluent can be used in the coating composition. The reactive diluent replaces a portion of the solvents used in the coating composition. The reactive diluent is a solvent for the polymer but upon drying and curing of the coating the reactive diluent reacts with the polymer to form a portion of the finish. The reactive diluent lowers viscosity and increases the solids content of the coating composition.

One useful reactive diluent is the reaction product of a carboxylic acid and an epoxy resin. Typical carboxylic acids that can be used are sorbic acid, itaconic acid, acrylic acid, maleic acid, fumaric acid, methacrylic acid, drying oil fatty acids, half esters of fumaric and maleic acid and the like. Typical epoxy resins that can be used are: epoxy resins of epichlorohydrin and bisphenol A, epichlorohydrin and hydrogenated bisphenol A, cycloaliphatic epoxy resins, heterocyclic epoxy resins, novolac epoxy resins, phenolic epoxy resins and the like. Usually these reaction products have an acid number less than 20.

A preferred reactive diluent is the reaction product of sorbic acid and an epoxy resin of epichlorohydrin and hydrogenated bisphenol A.

The coating composition is applied to a substrate by conventional techniques such as spraying, brushing, dipping roller coating, coil coating and the like. The coating composition can be applied to treated and untreated metal substrates or primed metal substrates. After application to a substrate, the resulting coating dries to a tack free condition in several minutes up to about 2 hours depending on the volatility of solvents in the composition and on ambient temperatures. The resulting coated article then can be handled and further processed. Curing of the coating continues at ambient temperatures for about one week to achieve optimum physical properties. The coating can be baked at about 50°-100° C. to accelerate drying and curing. Finishes of the dried and cured coating are about 1-5 mils in thickness.

The aforementioned characteristics make the coating composition particularly useful in the manufacture of construction equipment, farm equipment as an exterior or an interior finish. Other uses for the coating composition are refinishing automobiles and trucks, as a maintenance finish that requires a rapid drying time and as a transportation equipment finish.

The polymer used in the coating composition is an excellent pigment dispersant and is useful as a pigment dispersant. Pigment dispersions made with the polymer are compatible with many alkyd resins, acrylic resins, polyester resins and polyurethane resins. One typically useful polymer for forming pigment dispersions contains about 25 to 35% by weight methyl methacrylate, 15 to 25% by weight styrene, 15 to 25% by weight hydroxy ethyl methacrylate and 20 to 30% by weight drying oil fatty acids and can contain up to 5% by weight of the aforementioned

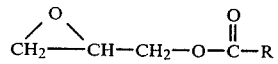

ester or other epoxy containing monomers.

Other useful coating compositions that provide finishes with improved flexibility use a polymer that is identical to the aforementioned polymers except the Tg is below 20° C. These coating compositions may not dry as rapidly as the aforementioned compositions, for example, a tack free condition may take from about 4-12 hours and above. However, these compositions cure to optimum physical properties in about one week to provide finishes that are flexible and durable.

Useful polymers for these coating compositions are of about 35-65% by weight of an alkyl methacrylate, 10-30% by weight of a hydroxy alkyl acrylate and 25-45% by weight of drying oil fatty acids. One typically useful polymer comprises methylmethacrylate, hydroxy ethyl acrylate and a mixture of oleic, linoleic and conjugated linoleic acid and has a Tg of about 15° C. This polymer by itself is useful to form a coating composition or can be blended with the aforementioned polymers having a relatively high Tg, i.e., 20° C. and above to form useful coating compositions.

These polymers can also contain up to 5% by weight of the above ester of other epoxy containing monomers.

The following examples illustrate the invention. All parts and percentages are on a weight basis unless indicated otherwise. Molecular weights (Mw) are determined by gel permeation chromatography using polystyrene as the standard.

EXAMPLE 1

A polymer solution is prepared as follows:

|  | Parts by Weight |
|---|---|
| Portion 1 | |
| Methyl methacrylate monomer | 658.99 |
| Hydroxy ethyl methacrylate monomer | 219.67 |
| Methyl ethyl ketone | 702.93 |
| 2-Mercapto ethanol | 38.66 |
| Portion 2 | |
| Methyl methacrylate monomer | 1801.26 |
| Hydroxy ethyl methacrylate monomer | 834.73 |
| 2-Mercapto ethanol | 46.74 |
| Portion 3 | |
| Methyl ethyl ketone | 841.76 |
| 2,2'-Azo bis (2,4-dimethyl valeronitrile) | 63.58 |
| Portion 4 | |
| Fatty Acid Mixture (about 20% oleic acid, 40% linoleic acid, and 40% conjugated linoleic acid) | 2062.85 |
| Dibutyl tin oxide | 5.70 |
| Portion 5 | |
| Xylene | 167.70 |
| Portion 6 | |
| "Cardura" E ester (A mixed ester of a synthetic tertiary carboxylic acid and has the formula $CH_2\text{---}\overset{O}{\overset{\diagup\ \diagdown}{CH\text{---}CH_2}}\text{---}O\text{---}\overset{O}{\overset{\|}{C}}\text{---}R$ where R is a tertiary aliphatic hydrocarbon group having 8-10 carbon atoms) | 236.32 |
| Portion 7 | |
| Xylene | 2292.27 |
| Total | 9973.16 |

Portion 1 is charged into a reaction vessel equipped with a stirrer, a heating mantle and a reflux consenser and heated to 88° C. Portion 2 is premixed and slowly added at a uniform rate to the reaction vessel over a 90 minute period. Portion 3 is premixed and 75% of portion 3 is added with Portion 2 over the 90 minute period while the resulting reaction mixture is held at its reflux temperature. The remaining 25% of Portion 3 is added over the next 60 minutes while maintaining the reaction mixture at its reflux temperature and then the reaction mixture is held at its reflux temperature for an additional 30 minutes. Portion 4 is added and the temperature of the reaction mixture is increased to 190° C. and methyl ethyl ketone is distilled from the reaction mixture. Then Portion 5 is added and the reaction mixture is controlled between 190°–210° C. and water from the reaction is removed. The reaction mixture is controlled at the above temperature until an acid number of 9 is achieved. Portion 6 is added to the reaction mixture and mixed for 30 minutes and then portion 7 is added with mixing and the resulting polymer solution is cooled to room temperature.

The polymer solution has a polymer solids content of about 70%. The polymer solution has a Gardner Holdt viscosity of about $Z_2$–$Z_4$.

The polymer contains 42.3% methyl methacrylate/18.1% hydroxyethyl methacrylate/35.5% ester side chains of oleic, linoleic acid and conjugated linoleic acid/4.1% by weight of "Cardura E" Ester and has an acid number of less than 4. The polymer has a glass transition temperature of about 20° C., a Mn of about 4900, a Mw of about 19,700 and a Mw Dist. of 4.01.

A coating composition is prepared as follows:

|  | Parts by Weight |
|---|---|
| Polymer solution (prepared above) | 142.86 |
| Drier Solution (65% solids of neodecanoic cobalt carboxylate in mineral spirits) | 0.83 |
| Methyl isobutyl ketone | 15.00 |
| Methyl ethyl ketoxime solution (5% solution of methyl ethyl ketoxime in xylene/methyl ethyl ketone/ethylene glycol monobutyl ether) | 1.70 |
| Total | 160.39 |

The resulting coating composition has a polymer weight solids content of about 63% and a Gardner Holdt viscosity measured at 25° C. of V+½.

The coating composition is sprayed onto a phosphatized steel panel and dried to a tack free film about 1–3 mils thick in about 1 hour. The film is a lacquer smooth, glossy film that is free of imperfections and cures to a hard weather resistant film in about 5 days.

EXAMPLE 2

A reactive diluent is prepared as follows:

|  | Parts by Weight |
|---|---|
| Portion 1 |  |
| Sorbic Acid | 896.0 |
| Toluene | 324.0 |
| Benzyl dimethylamine | 10.0 |
| Portion 2 |  |
| "Eponex" DRH 151.3 (Epoxy resin of epichlorohydrin and hydrogenated Bisphenol A having an *Epoxide Equivalent Weight of 235.) | 1880.0 |
|  | 420.00 |
| Portion 3 |  |
| Isopropanol | 385.7 |
| Total | 3915.7 |

*Epoxide Equivalent Weight - weight in grams of resin that contains one gram equivalent of epoxide.

Portion 1 is changed into a reaction vessel equipped as in Example 1 and heated to its reflux temperature of about 120° C. Portion 2 is added to the reaction vessel over a 60 minute period while maintaining the resulting reaction mixture at its reflux temperature. The reaction mixture is held at its reflux temperature until the acid number of the reaction mixture is 10 or less. Portion 3 is added and the resulting reaction mixture is cooled to room temperature.

A polymer/drier solution is parpared by blending together the following constituents:

|  | Parts by Weight |
|---|---|
| Polymer Solution (prepared in Example 1) | 143.0 |
| Drier Solution (54% solids of cobalt naphthenate drier in mineral spirits) | 1.6 |
| Methyl isobutyl ketone | 9.3 |
| Total | 153.9 |

A reactive diluent/drier solution is prepared by blending together the following constituents:

|  | Parts By Weight |
|---|---|
| Reactive Diluent (prepared above) | 143.0 |
| Drier Solution (prepared above) | 1.6 |
| Methyl isobutyl ketone | 9.3 |
|  | 153.9 |

The following coating compositions are prepared by blending together the constituents:

| Coating Composition | 1 | 2 | 3 | 4 | 5 | 6 | 7 |
|---|---|---|---|---|---|---|---|
| Polymer/Drier Solution (prepared above) | 95g | 90g | 85g | 80g | 75g | 100g | — |
| Reactive Diluent Solution (prepared above) | 5g | 10g | 15g | 20g | 25g | — | 100g |
| % Solids | 65 | 65 | 65 | 65 | 65 |  | 65 |
| Gardner Holdt viscosity | X−¼ | X−½ | V | V−½ | V−½ | Y | N+½ |

Each of the coating compositions are sprayed onto separate phosphatized steel panels and dried at ambient temperatures to provide a film about 2 mils thick. Tack free time is determined, film thickness measured, resistance to a hot trisodium phosphate solution after two days curing is measured and Cleveland Humidity resistance is measured after two days curing.

| Coating Composition | 1 | 2 | 3 | 4 | 5 | 6 | 7 |
|---|---|---|---|---|---|---|---|
| Tack Free Drying Time | 1.0hr. | 1.0hr | 2hrs | 2hrs | 2hrs | 1.0hr | over night |
| Appearance | | | All had a good appearance | | | | |
| Resistance to Hot Trisodium Phosphate Solution | No Wrinkles | No Wrinkles | No Wrinkles | No Wrinkles | No Wrinkles | 90% Wrinkled | Failed |

EXAMPLE 3

A polymer solution is prepared as follows:

| | Parts By Weight |
|---|---|
| Portion 1 | |
| Methyl methacrylate monomer | 730.46 |
| Hydroxyethyl methacrylate monomer | 243.49 |
| Methyl ethyl ketone | 779.17 |
| 2 Mercapto ethanol | 85.71 |
| Portion 2 | |
| Methyl methacrylate monomer | 1996.62 |
| Hydroxyethyl methacrylate monomer | 925.27 |
| 2 Mercaptoethanol | 103.63 |
| Portion 3 | |
| Methyl ethyl ketone | 933.06 |
| 2,2'-Azo bis(2,4-dimethyl valeronitrile) | 70.47 |
| Portion 4 | |
| Fatty Acid Mixture (about 20% oleic acid 40% linoleic acid, and 40% conjugated linoleic acid) | 1932.83 |
| Dibutyl tin oxide | 5.45 |
| Portion 5 | |
| Xylene | 50.16 |
| Portion 6 | |
| Xylene | 2366.00 |
| Total | 10,222.32 |

Portion 1 is charged into a reaction vessel equipped as in Example 1 and heated to 90° C. Portion 2 is premixed and slowly added at a uniform rate to the reaction vessel over a 90 minute period. Portion 3 is premixed and 75% of portion 3 is added with Portion 2 over the 90 minute period while the resulting reaction mixture is held at its reflux temperature. The remaining 25% of Portion 3 is added over the next 60 minutes while maintaining the reaction mixture at its relfux temperature and then the reaction mixture is held at its reflux temperature for an additional 30 minutes. Portion 4 is added and the temperature of the reaction mixture is increased to 190° C. and methyl ethyl ketone is distilled from the reaction mixture. Portion 5 is added and the reaction mixture is controlled between 190°–210° C. and water from the reaction is removed. The reaction mixture is controlled at the above temperature until an acid number of 5 is achieved. Portion 6 is added with mixing and the resulting polymer solution is cooled to room temperature.

The Polymer solution has a polymer solids content of about 70%. The polymer solution has a Gardner Holdt viscosity of about $Z-Z_3$.

Polymer contains 47% methyl methacrylate, 20% hydroxyethyl methacrylate, 33% ester side chains of oleic, and linoleic acid and conjugated linoleic acid and has an acid number of about 5. The polymer has a glass transition temperature of about 20° C., a Mn of about 3,720, a Mw of about 12,100 and a Mw Dist. of 3.25.

A paint is prepared by thoroughly blending the following constituents:

| | |
|---|---|
| Polymer Solution (prepared above) | 42.15 |
| Drier Solution (54% solids of cobalt naphthenate in mineral spirits) | 0.29 |
| Drier Solution (65% solids of neo-decanoic cobalt carboxylate in in mineral spirits) | 0.88 |
| Drier Solution (71% solids lead tallate in aromatic controlled mineral spirits) | 0.14 |
| "Allusec" S15 Aluminum Complex Solution (31% solids of an aluminum complex in ethylene glycol monoethyl ether, the solution containing about 5.9% by weight aluminum) | 17.74 |
| Violet Mlll Base (49% polymer Solution prepared above, 10% "Monastral" violet pigment and 41% hydrocarbon solvent) | 10.68 |
| Methyl ethyl ketoxime | 0.24 |
| Orange Mill Base (14% polymer solution prepared above, 0.3% methyl ethyl ketoxime, 66.7% molybdate orange pigment and 19% xylene) | 17.37 |
| Alkyd Resin Plasticizer (83% solids of a linseed oil glycerol phthalate resin containing 64% linseed oil and having an acid number of 3–5 in a solvent mixture of toluene/ aromatic controlled mineral spirits/ monobutyl ether acetate) | 10.51 |
| Total | 100.00 |

The above paint is sprayed onto phosphatized steel panels and dried at room temperature. The resulting finish is about 1.3 mils thick and tack free after about 1 hours. After 24 hours the finish has a gloss measured at 20° of 83 and at 60° of 92, a pencil hardness of 6B, has good adhesion to the substrate, only very slight water spotting. After two days the finish has about the same gloss and hardness and has good moisture resistance and good resistance to hot trisodium phosphate.

EXAMPLE 4

A polymer solution is prepared as follows:

| | Parts By Weight |
|---|---|
| Portion 1 | |
| Methyl methacrylate monomer | 548.48 |
| Hydroxyethyl acrylate monomer | 235.06 |
| Methyl ethyl ketone | 783.54 |
| 2 Mercapto ethanol | 25.86 |
| Portion 2 | |
| Methyl methacrylate monomer | 2193.91 |
| Hydroxyethyl acrylate monomer | 940.25 |
| 2-Mercapto ethanol | 66.01 |
| Portion 3 | |
| Methyl ethyl ketone | 938.29 |
| 2,2'-Azo bis(2,4-dimethyl valeronitrile) | 70.87 |

|  | Parts By Weight |
|---|---|
| Portion 4 | |
| Fatty Acid Mixture (20% oleic acid, 40% linoleic acid, 40% conjugated linoleic acid) | 1896.12 |
| Dibutyl tin oxide | 5.88 |
| Portion 5 | |
| Xylene | 167.95 |
| Portion 6 | |
| "Cardura" E Ester (described in Example 1) | 242.19 |
| Portion 7 | |
| Xylene | 2069.21 |
| Total | 10,183.62 |

Portion 1 is charged into a reaction vessel equipped as in Example 1 and heated to 90° C. Portion 2 is premixed and slowly added at a uniform rate to the reaction vessel over a 90 minute period. Portion 3 is premixed and 75% of portion 3 is added with Portion 2 over the 90 minuted period while the resulting reaction mixture is held at its reflux temperature. The remaining 25% of Portion 3 is added over the next 60 minutes while maintaining the reaction mixture at its reflux temperature and then the reaction mixture is held at its reflux temperature for an additional 30 minutes. Portion 4 is added and the temperature of the reaction mixture is increased to 190° C. and methyl ethyl ketone is distilled from the reaction mixture. Then Portion 5 is added and the reaction mixture is controlled between 190°–210° C. and water from the reaction is removed. The reaction mixture is controlled at the above temperature until an acid number of 5 is achieved. Portion 6 is added and mixed for 30 minutes and then Portion 7 is added with mixing and the resulting polymer solution is cooled to room temperature.

The polymer solution has a polymer solids content of about 70%. The polymer solution has a Gardner Holdt viscosity of about $Z_1$–$Z_4$ The polymer contains 45.3% methyl methacrylate, 19.4% hydroxyethyl methacrylate, 31.3% ester side chains of oleic acid, linoleic acid and conjugated linoleic acid and 4.0% "Cardura" E Ester and has an acid number of about 5. The polymer has a glass transition temperature of about 15, a Mn of about 7,050, a Mw of 26,700 and a Mw Dist. of 3.79.

A paint is prepared by thoroughly blending the following constituents:

| | |
|---|---|
| Polymer Solution (prepared in Example 1) | 21.08 |
| Polymer Solution (prepared above) | 21.07 |
| Drier Solution (54% solids of cobalt naphthenate in mineral spirits) | 0.29 |
| Drier Solution (65% solids of neo-decanoic cobalt carboxylate in mineral spirits) | 0.88 |
| Drier Solutions (71% solids lead tallate in aromatic controlled mineral spirits) | 0.14 |
| "Alusec" Complex Solution (described in Example 3) | 17.74 |
| Violet Mill Base (described in Example 3) | 10.68 |
| Methyl ethyl ketoxime | 0.24 |
| Orange Mill Base (described in Example 3) | 17.37 |
| Alkyd Resin Plasticizer (described in Example 3) | 10.51 |
| Total | 100.00 |

The above paint is sprayed onto phosphatized steel panels and dried at room temperature. The resulting coating is about 2 mils thick and is tack free after about 8–10 hours. After 24 hours, the finish has a gloss measured at 20° of about 83 and at 60° of about 9, a pencil hardness of about 48, good adhesion to the substrate and good flexibility. After one week the finish has about the same gloss, hardness and flexibility.

EXAMPLE 5

A polymer solution is prepared as follows:

| | Parts By Weight |
|---|---|
| Portion 1 | |
| Methyl methacrylate monomer | 522.06 |
| Styrene monomer | 175.28 |
| Hydroxyethyl methacrylate monomer | 276.85 |
| Methyl ethyl ketone | 584.40 |
| 2 Mercapto ethanol | 311.17 |
| Portion 2 | |
| Methyl methacrylate monomer | 1231.52 |
| Styrene | 887.60 |
| Hydroxyethyl methacrylate | 891.79 |
| 2 Mercaptoethanol | 124.67 |
| Portion 3 | |
| Methyl ethyl ketone | 389.60 |
| 2,2'-Azo (bis(2,4-dimethyl valeronitrile) | 86.49 |
| Portion 4 | |
| Toluene | 989.58 |
| Methyl ethyl ketone | 77.92 |
| 2,2'-Azo bis(2,4-dimethyl valeronitrile) | 62.34 |
| Portion 5 | |
| Fatty acid mixture (described in Example 4) | 1403.35 |
| Portion 6 | |
| Xylene | 77.80 |
| Portion 7 | |
| "Cardura" E Ester (described in Example 1) | 220.08 |
| Portion 8 | |
| Xylene | 2417.88 |
| Total | 10730.38 |

Portion 1 is charged into a reaction vessel equipped as in Example 1 and heated to 90° C. Portion 2 is premixed and slowly added at a uniform rate to the reaction vessel over a 210 minute period. Portion 3 is premixed and is added with Portion 2 over the 210 minute period while the resulting reaction mixture is held at its reflux temperature. Portion 4 is premixed and 70% of Portion 4 is added with mixing while maintaining the reaction mixture at its reflux temperature over a 40 minute period and then the remaining 30% of Portion 4 is added over the next 40 minute period and the reaction mixture is held at its reflux temperature for an additional 20 minutes. Portion 5 is then added and heated to about 190° C. and methyl ethyl ketone is distilled from the reaction mixture. Then Portion 6 is added and the reaction mixture is controlled between 190°–210° C. and water from the reaction is removed. The reaction mixture is controlled at the above temperature until an acid number of about 8-11 is achieved. Portion 7 is added and mixed for 20 minutes and held until an acid number of 5 is achieved and then Portion 8 is added with mixing and the resulting polymer solution is cooled to room temperature.

The polymer solution has a polymer solids content of about 70%. The polymer solution has a Gardner Holdt viscosity of about Y-Z$_1$.

The polymer contains 31.3% mehtyl methacrylate, 19% styrene, 20.8% hydroxyethyl methacrylate, 25.0% ester side chains of oleic, linoleic acid and conjugated linoleic acid, 3.9% "Cardura" E ester and has an acid number of about 5. The polymer has a Mn of about 2,710, a Mw of about 7,320 and a Dispersity of 2.7.

The following dispersions are prepared with the above polymer solution using convention grinding and dispersing techniques well known in the art: titanium dioxide pigment dispersion, iron oxide pigment dispersion, "Monastral" violet pigment dispersion and molybdate orange pigment dispersion.

Each of these pigment dispersions are blended with a conventional alkyd resin solution, an acrylic resin solution and a polyester resin solution, and conventional crosslinking agents are added to each of these resin solutions such as an alkylated malamine formaldehyde resin, benzoguanamine formaldehyde resin or an organic polyisocyanate. Each of the compositions is formulated into a coating composition with conventional solvents and sprayed onto phosphate treated and untreated steel panels and baked under conventional conditions. In each case an acceptable coating composition was formed and the resulting finishes were smooth and even indicating that the above polymer solution was a good pigment dispersant.

Each of the above prepared pigment dispersions was added to an ambient temperature drying and curing coating composition of Miller U.S. Pat. No. 3,585,160 and each gave a high quality coating composition which after spray application to a phosphatized steel substrate and after drying and curing gave a smooth and even finish of a high quality. This indicates that the above polymer solution is a good pigment dispersant.

We claim:

1. A high solids coating composition comprising a polymer having a backbone of polymerized monomers selected from the group consisting of an alkyl methacrylate, an alkyl acrylate, styrene or mixtures thereof and polymerized hydroxyl containing monomers selected from the group consisting of a hydroxy alkyl acrylate, a hydroxy alkyl methacrylate of mixtures thereof, wherein the active hydrogen of at least one pendant hydroxyl group of the backbone is replaced by

where R is the residual of a drying oil fatty acid and wherein the polymer has a glass transition temperature of at least 20° C.

2. The coating composition of claim 1 containing pigment.

3. The coating composition of claim 1 containing about 5-70% by weight of a solvent for the polymer and 95-30% by weight of the polymer.

4. The coating composition of claim 3 in which the polymer has a glass transition temperature of at least 20° C. and up to about 65° C.

5. The coating composition of claim 4 in which the polymer has a number average molecular weight of about 1,500-8,000 and a weight average molecular weight of about 6,000-30,000 and a molecular weight distribution of about 1-5.

6. The coating composition of claim 5 in which the polymer comprises about 35-65% by weight of an alkyl methacrylate, 10-30% by weight of a hydroxy alkyl methacrylate or a hydroxy alkyl acrylate each having 2-4 carbon atoms in the alkyl group and 25-45% by weight of drying oil fatty acids.

7. The coating composition of claim 6 in which the polymer consists essentially of 40-55% by weight of methyl methacrylate, 15-25% by weight of hydroxy ethyl methacrylate and 30-40% by weight of a mixture of drying oil fatty acids which comprises oleic acid, linoleic acid and conjugated linoleic acid.

8. The coating composition of claim 7 in which the polymer contains in addition up to about 10% by weight, based on the weight of the polymer, of an ester of the formula

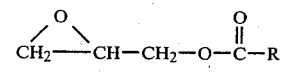

where R is an aliphatic hydrocarbon group.

9. The coating composition of claim 6 that contains about 1-40% by weight, based on the weight of the polymer, of a reactive diluent which is an ester of a carboxylic acid and an epoxy resin.

10. The coating composition of claim 9 in which the reactive diluent is the esterification product of sorbic acid and an epoxy resin.

11. The coating composition of claim 6 that contains about 0.1-5% by weight, based on the weight of the coating composition, of an organo metallic drier.

12. The coating composition of claim 11 in which the metal of said organo metallic drier is selected from the group consisting of cobalt, copper, lead, zirconium, calcium, iron, nickel, tin, zinc and lithium.

13. The coating composition of claim 6 containing about 0.1-5% by weight, based on the weight of the polymer, of aluminum metal from an organo aluminum complex.

14. The coating composition of claim 2 containing about 40-95% by weight, based on the weight of the coating composition, of the polymer, about 1-25% by weight, based on the weight of the polymer, which is a reactive diluent of an ester of sorbic acid and an epoxy resin and a solvent for the polymer;

wherein the polymer consists essentially of 40-55% by weight of methyl methacrylate, 15-25% by weight of hydroxy ethyl methacrylate and 30-40% by weight of a mixture of drying oil fatty acids which consists essentially of oleic acid, linoleic acid, and conjugated linoleic acids, and the polymer has a number average molecular weight of about 3,000-7,000 and a weight average molecular weight of about 10,000-25,000, a molecular weight distribution of about 2-4 and a glass transition temperature of at least 20° C. and up to 60° C. and contains about 0.01-5% by weight, based on the weight of the coating composition, of an organo metallic drier.

15. The coating composition, of claim 14 in which the polymer contains in addition up to about 10% by weight, based on the weight of the polymer, of an ester of the formula

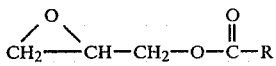

where R is a tertiary aliphatic hydrocarbon group having 8-10 carbon atoms.

16. The coating composition of claim 15 that contains in addition about 0.1-5% by weight, based on the weight of the polymer, of aluminum metal from an organo aluminum complex.

17. An article coated with a dried coalesced and cured film of the composition of claim 1.

18. A metal substrate coated with an about 1-5 L mil thick film of a dried coalesced and cured coating composition of claim 16.

19. A high solids coating composition comprising a blend of polymers having a glass transition temperature of at least 20° C. consisting essentially of (1) a polymer having a glass transition temperature of at least about 20° C. up to about 65° C. and having a backbone of polymerized monomers selected from the group consisting of an alkyl methacrylate, and alkyl acrylate, styrene or mixtures thereof and hydroxy containing monomers selected from the group consisting of a hydroxy alkyl acrylate, a hydroxy alkyl methacrylate or mixtures thereof, wherein the active hydrogen of at least one pendant hydroxyl group of the backbone is replaced by

where R is the residual of drying oil fatty acids; and (2) a polymer having a glass transition temperature below 20° C. and having a backbone of polymerized monomers selected from the group consisting of an alkyl methacrylate, an alkyl acrylate, styrene or mixtures thereof and hydroxy containing monomers selected from the group consisting of a hydroxy alkyl acrylate, a hydroxy alkyl methacrylate or mixtures thereof, wherein the active hydrogen of at least one pendant hydroxyl group of the backbone is replaced by

where R is the residual of drying oil fatty acids.

20. A pigment dispersant of a polymer consisting essentially of 25-35% by weight of methyl methacrylate, 15-25% by weight of styrene, 15-25% by weight of hydroxy alkyl methacrylate or a hydroxy alkyl acrylate each having 2-4 carbon atoms in the alkyl group and 20-30% by weight of the residual of drying oil fatty acids which are attached to the polymer by replacing an active hydrogen of at least one hydroxyl group provided by the hydroxy alkyl acrylate or hydroxy alkyl methacrylate with

where R is the residual of drying oil fatty acids.

21. The pigment dispersant of claim 20 in which the polymer has a number average molecular weight of about 1,500–8,000 and a weight average molecular weight of about 6,000–30,000 and a molecular weight distribution of about 1-5.

22. The pigment dispersant of claim 21 in which the polymer contains in addition up to about 10% by weight, based on the weight of the polymer, of an ester of the formula

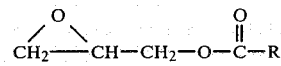

where R is an aliphatic hydrocarbon group.

23. The pigment dispersant of claim 21 in which the polymer consists essentially of methyl methacrylate, styrene, hydroxy ethyl methacrylate and a mixture which comprises drying oil fatty acids of oleic acid, linoleic acid and conjugated linoleic acid.

24. A high solids coating composition comprising a polymer having a backbone of polymerized monomers selected from the group consisting of an alkyl methacrylate, an alkyl acrylate, styrene or mixtures thereof and hydroxyl containing monomers selected from the group consisting of a hydroxy alkyl acrylate, a hydroxy alkyl methacrylate or mixtures thereof, wherein the active hydrogen of at least one pendant hydroxyl group of the backbone is replaced by

where R is the residual of drying oil fatty acids and wherein the polymer has a glass transition temperature below 20° C.

25. The coating composition of claim 24 containing pigment.

26. The coating composition of claim 24 containing about 5-70% by weight of a solvent for the polymer and 95-30% by weight of the polymer.

27. The coating composition of claim 26 in which the polymer has a number average molecular weight of about 1,500–8,000 and a weight average molecular weight of about 6,000–30,000 and a molecular weight distribution of about 1-5.

28. The coating composition of claim 27 in which the polymer comprises about 35-65% by weight of an alkyl methacrylate, 10-30% by weight of a hydroxy alkyl acrylate having 2-4 carbon atoms in the alkyl group and 25-45% by weight of drying oil fatty acids.

29. The coating composition of claim 28 in which the polymer comprises methyl methacrylate, hydroxy ethyl acrylate and a mixture drying oil fatty acids which comprises oleic acid, linoleic acid and conjugated linoleic acid.

* * * * *